US012331570B2

(12) United States Patent
Cafuta

(10) Patent No.: US 12,331,570 B2
(45) Date of Patent: Jun. 17, 2025

(54) SEAL OF VERTICALLY MOVABLE FACADE COMPONENTS

(71) Applicant: BEWISO GMBH, Wildon (AT)

(72) Inventor: Thomas Cafuta, Graz (AT)

(73) Assignee: BEWISO GMBH (AT)

( * ) Notice: Subject to any disclaimer, the term of this patent is extended or adjusted under 35 U.S.C. 154(b) by 0 days.

(21) Appl. No.: 17/927,197

(22) PCT Filed: May 25, 2021

(86) PCT No.: PCT/EP2021/063887
§ 371 (c)(1),
(2) Date: Nov. 22, 2022

(87) PCT Pub. No.: WO2021/234180
PCT Pub. Date: Nov. 25, 2021

(65) Prior Publication Data

US 2023/0203866 A1 Jun. 29, 2023

(30) Foreign Application Priority Data

May 22, 2020 (DE) ..................... 10 2020 113 851.2

(51) Int. Cl.
*E05D 15/20* (2006.01)

(52) U.S. Cl.
CPC ........ *E05D 15/20* (2013.01); *E05Y 2900/148* (2013.01)

(58) Field of Classification Search
CPC ....... E05D 15/20; E05D 15/16; E05D 15/565; E05B 17/0025; E05F 11/14; E05F 11/12
See application file for complete search history.

(56) References Cited

U.S. PATENT DOCUMENTS 7,845,744 B2 * 12/2010 Chen ...................... A47B 88/46 312/334.6
7,963,577 B2 * 6/2011 Wolf ...................... E05C 9/002 292/DIG. 20

(Continued)

FOREIGN PATENT DOCUMENTS

FR 2369405 A1 * 5/1978
GB 2301140 A * 11/1996 ......... E05B 17/0025

OTHER PUBLICATIONS

English translation of FR2369405A1 from espacenet (Year: 1978).*

*Primary Examiner* — Daniel J Troy
*Assistant Examiner* — Susan M. Heschel
(74) *Attorney, Agent, or Firm* — Lerner David LLP

(57) ABSTRACT

A hardware for a slidable facade component includes at least two guide pins for a first side and at least two guide pins for a second side of the component. An actuating rod arrangement for transmitting an actuating force includes a first actuating rod and a second actuating rod for the first side and the second side, respectively, of the component. An actuating device is coupled to the drive rod assembly for transmitting the actuating force to the first and second drive rods with an actuation. The guide pins are eccentric bearing pins with an eccentrically arranged axis of rotation for rotatable attachment to the component and are provided for engagement with a guide groove arrangement arranged in the frame area. The eccentric bearing pins are each coupled to one of the drive rods via a coupling element and are rotatable via a longitudinal movement of the drive rods.

22 Claims, 8 Drawing Sheets

(56) References Cited

U.S. PATENT DOCUMENTS

| | | | | |
|---|---|---|---|---|
| 8,245,445 | B2 * | 8/2012 | Palacios | E05D 15/20 49/128 |
| 9,234,374 | B2 * | 1/2016 | Wolf | E05C 9/021 |
| 9,719,279 | B2 * | 8/2017 | Subliskey | E05C 1/12 |
| 10,570,652 | B2 * | 2/2020 | Liang | E05C 3/045 |
| 11,060,334 | B2 * | 7/2021 | Augustin | E05D 15/20 |
| 2016/0040473 | A1 * | 2/2016 | Aguerre | E06B 7/22 49/404 |

* cited by examiner

SEAL OF VERTICALLY MOVABLE FACADE COMPONENTS

FIELD OF INVENTION

The present invention relates to sealing of vertically slidable facade components, and is particularly related to a hardware for a slidable facade component, a facade system and a method for moving a slidable facade component.

BACKGROUND OF THE INVENTION

In case of slidable facade components, such as horizontal sliding windows and vertical sliding windows, an opening and closing is done by translation of the facade component. Special requirements exist for the sealing between the movable element and the surrounding blind or post frame structure. In DE 2145140 A, the sash is connected to its guide rails via two pairs of support arms extending transversely to the window plane, so that the sash can be tilted into its closed position. In DE 10 2016 105064 A1, the movable sash is held on movable arms. The distance between the retaining elements and the base structure is variable to provide a variable seal for the slidable component transverse to the sliding movement. However, it has been shown that in connection with, for example, passive houses, the energy requirements for the building envelope have increased and thus also the requirements for the sealing.

SUMMARY OF THE INVENTION

It is therefore an object of the present invention to provide an improved sealing.

This is solved by the subject matter of the independent claims. Further examples are given in the dependent claims. The aspects described below also apply to the hardware for a movable facade component, to the facade system and to the method for moving a movable facade component.

According to the invention, a hardware for a slidable facade component is provided. The hardware has a guide pin arrangement for the slidable facade component, an actuating rod arrangement for transmitting an actuating force, and an actuating device. The guide pin arrangement comprises at least two guide pins for a first side of the slidable facade component and at least two guide pins for a second side of the slidable facade component opposite the first side. The drive rod arrangement comprises a first drive rod for the first side of the slidable facade component and a second drive rod for the second side of the slidable facade component. The actuating device is coupled to the drive rod arrangement to transmit the actuating force to the first and second drive rods with an actuation. The guide pins are each designed as eccentric bearing pins with an eccentrically arranged axis of rotation for rotatable attachment to the slidable facade component and are provided for engagement with a guide groove arrangement arranged in the frame area. The eccentric bearing pins are each coupled to one of the drive rods via a coupling element, and are rotatable via a longitudinal movement of the drive rods. The guide pin arrangement is designed to move the movable facade component transversely to the guide direction by the eccentric bearing pins supported in the guide groove arrangement, in order to cause the movable facade component to be pressed against a fixed frame region transversely to the guide direction.

The sliding facade component can also be referred to as a slidable component.

The term "hardware" refers to a hardware arrangement for the movable attachment of a sliding facade component.

The term "slidable facade component" refers to a component for openably closing an opening in the building envelope. The slidable facade component is, for example, a window or a door, i.e. a sliding window or a sliding door.

For example, the guide groove assembly has a first guide groove and a second guide groove.

The term "guide pin" refers to a pin projecting from the facade component that engages with a guide device to guide the facade component during sliding movement. The guide device is, for example, a guide groove.

The term "eccentric" refers to an arrangement of the pivot axis such that the guide pin protrudes to different degrees on at least one side as a result of rotation about the pivot axis.

The term "driving rods" refers to elongated elements that can be used to transmit tensile and pressing forces along the lateral edges of the facade component. In case of a window sash, for example, the driving rods are provided along the sash frames. For example, the drive rods are recessed into the sash frames.

The term "transverse to the guiding direction" refers to a direction transverse to the sliding direction of the slidable component; for example, perpendicular to the plane of the slidable component.

In an example, the eccentric bearing pins are round discs.

In another example, the eccentric bearing pins are oval or elliptical discs.

The actuating device is designed, for example, as a handle for manual actuation.

In another example, the actuating device is an actuator, for example, an electric motor or an electromagnetic actuator.

The coupling element is serves for conversion of a first translation in a first direction, i.e. linear movement along the side of the slidable component, into a rotational movement of the eccentric bearing pins which, by being supported in the guide groove, convert the rotational movement into a second translation in a second direction which is transverse, e.g. perpendicular, to the first direction.

The first direction can be referred to as the first direction of translation and the second direction can be referred to as the second direction of translation.

In an example, a slidable component of a facade system is provided with a hardware. The hardware includes a guide pin arrangement, an actuating rod arrangement, and an actuating device. The guide pin arrangement for the slidable component comprises at least two guide pins for a first side of the slidable component and at least two guide pins for a second side of the slidable component opposite the first side. The driving rod arrangement is provided for transmitting an actuating force and comprises a first driving rod for the first side of the slidable component and a second driving rod for the second side of the slidable component. The actuating device is coupled to the connecting rod assembly to transmit the actuating force to the first and second connecting rods with an actuation. The guide pins are each rotatably mounted to the slidable component as eccentric bearing pins having an eccentrically disposed axis of rotation. The guide pins are provided for engagement in a guide groove arranged in the frame area. The eccentric bearing pins are each coupled to one of the drive rods via a coupling element and can be rotated via a longitudinal movement of the drive rods. The guide pin arrangement is designed to move the slidable component transversely to the guide direction by the eccentric bearing pins supported in the guide groove in order to cause the slidable component to be pressed against a stationary frame region.

According to an example, the coupling element is designed as a detachable connection between the eccentric bearing pin and the drive rod. The coupling element can be coupled with a pin attached to the drive rod.

The bolt can be selected from a plurality of bolts, for example mushroom pins. This allows the use of common window hardware, i.e. common driving rods. In an example, it is envisioned that the window sash will be equipped with any window hardware, for example on three sides (right, left, and top center), as long as that hardware has protruding pins on the hinges. The eccentric bearing pivots and the coupling elements can then be arranged by simply fixing them. The window hardware (hinges) is thus interchangeable to a certain extent.

The detachable connection can also be referred to as connection interface.

According to an example, the coupling element and the eccentric bearing pin are integrally formed as an adapter attachment. The adapter attachment has a first portion that has a round outer contour, and a second portion that has a slot for insertion of a free bolt end. The adapter attachment has a hole arranged eccentrically to the round outer contour for rotatable attachment of the adapter attachment to a frame segment of the movable facade component.

The adapter attachment is universally applicable, as it can be coupled with different driving rod systems.

The adapter attachment can also be referred to as a sealing adapter, press-on gear or sealing gear.

According to an example, the adapter attachment is made of plastic.

According to an example, the coupling element and the eccentric bearing pin form a gear for converting a longitudinal movement of a drive rod extending parallel to the plane of the movable facade component into a movement of the movable facade component directed transversely to the plane of the movable facade component.

The longitudinal, i.e. linear, movement is converted into a rotational movement, which, due to the eccentricity of the rotatable support, causes the movement to be transverse to the plane of the slidable facade component.

The coupling element forms the connection with the driving rod. For example, the slot allows engagement of a bolt attached to the drive rod. By a distance between the point of engagement of the bolt and the rotatable attachment of the eccentric bearing pin, a leverage effect is provided with which the eccentric bearing pin can be rotated.

According to an example, the coupling element is a lever that protrudes from the eccentric bearing pin and that has a slot for engagement with a pin attached to the drive rod.

The pin is designed as a mushroom pin, for example.

Movement of the driving rod moves the pin, which in turn moves the lever. The slot serves to balance the translation and rotation, so to speak.

The pin and lever form a gear for converting a first linear driving force via the drive rods into a second linear sealing force.

According to an example, the actuation has a counter-rotating gear. With the actuation, the first drive rod and the second drive rod can be moved in the same direction with respect to the slidable component. For example, the first drive rod and the second drive rod both move downward, or both move upward when actuated in a lateral arrangement (e.g., a vertical sliding window). The first drive rod and the second drive rod move, for example, both to the right or both to the left when actuated in an arrangement at the top and bottom (e.g. in a horizontal sliding window).

According to an example, at least one of the eccentric bearing pins is formed with a locking disc having a receptacle for engagement with a locking pin provided on a fixed frame portion. In another option, the receptacle is formed as i) a continuous slot having two edge segments that can be moved into the area of the locking pin such that movement of the slidable component along the guide groove is blocked. In a further option, the receptacle is designed as ii) an entry slot with an edge segment that can be moved in front of the locking bolt in such a way that movement of the slidable component along the guide groove is blocked.

The design of the receptacle as an inlet slot or as a continuous slot are both provided as options.

In an example, the two edge segments are formed as two arcuate segments that are movable in front of the locking bolt in such a way that movement of the slidable component along the guide groove is blocked. As an option, it is provided that the locking bolt has a cross-section extending longitudinally in the guide direction.

In case of a continuous slot, for example, in addition to the end position (i.e. the closed position of the slidable component), a lock can also be provided in the intermediate position, e.g. in case of a gap ventilation position of the slidable component.

In an example, the locking disc is connected to the lever and/or the eccentric bearing pin and rotates simultaneously with the eccentric bearing pin.

The locking bolt is provided, for example, on a plate that is attachable to a post frame.

The engagement with the locking pin can also be used to press the slidable component against a stop, for example to achieve a better sealing.

According to an example, at least one eccentric bearing pin is provided on each of the first and second sides with the locking disc with inlet slot. The entry slot is formed with the edge segment on the first side as a mirror image of the entry slot with the edge segment on the second side. With the actuation, the first drive rod and the second drive rod can be moved in opposite directions with respect to the slidable component.

According to an example, there is additionally provided a locking assembly comprising a rotatably mounted rotary latch having a hook at a first end for engaging a locking plate secured to a fixed frame portion. At a second end opposite the first end, the rotary latch has a slot for engagement with a bolt attached to the drive rod.

The closure arrangement can also be referred to as a locking arrangement. The slot can also be referred to as a locking or interlocking slot. The bolt can also be referred to as a locking or interlocking bolt.

For example, the closure arrangement is provided on the upper edge area of a vertical sliding window.

According to an example, an insert is provided which is designed for engagement in the guide groove arrangement arranged in the frame region and for coupling with the eccentric bearing pin. The insert has an e.g. circular receptacle for the eccentric bearing pin and is formed with at least one outer linear longitudinal edge as a contact surface in the guide groove arrangement.

In an option, it is provided that the insert is made of plastic.

In an embodiment, the insert is made of metal, for example, die-cast aluminum.

The linear longitudinal edge means that the eccentric bearing pin does not press into the wood when it is pressed on, as the force can be better distributed.

For example, the insert is made of polyamide.

According to an example, two parallel outer linear longitudinal edges are formed.

As an option, spring regions are provided on the parallel outer linear longitudinal edges on at least one side, which project resiliently beyond an abutment region of the longitudinal edges in the direction of the cross-section of the guide groove arrangement.

As an option, the spring areas are provided to protrude in the longitudinal direction of the guide groove arrangement.

As a further option, it is provided that a spring force of the spring sections can be adjusted to set a contact pressure of the lateral cantilevers for generating a braking effect.

The spring effect is achieved, for example, by a projection of 0.5 mm. Said one, i.e. first, outer linear longitudinal edge serves to bear against one side face of the guide groove arrangement in the closed state when the slidable facade component is pressed sealingly against the fixed frame area. The other, i.e. second, outer linear longitudinal edge serves for abutting the opposite side surface of the guide groove arrangement when the slidable facade component is to be brought from the sealing position to the sliding position, i.e. when the slidable facade component is pressed away from the fixed frame area.

In accordance with the invention, a handle device is also provided. The handle device has a handle rotatably mounted between a first position and a second position through approximately 180°. The handle device further comprises an edge contour connected to the handle. The handle is connectable, for example via a square, to an actuating rod arrangement for transmitting an actuating force for a hardware according to one of the preceding examples. The edge contour has an axially projecting edge transverse to the direction of rotation and is configured to engage a fixed mating member for locking. The axially projecting edge has an elliptical contour in the direction of rotation.

The axially protruding edge, in interaction with the fixed counterpart, causes a transfer of tensile forces to attract the movable facade component to the, for example, fixed or likewise movable facade component. The edge follows an ellipse in order to take into account or compensate for the horizontal offset of the sash when pressing on.

The axially protruding edge engages, for example, after approx. 90° of rotation.

The handle allows one-handed operation. For example, the handle is designed based on historical examples.

The handle not only effects pressing and thus sealing, but also locking.

According to the invention, there is also provided a facade system having a fixed opening edge forming a facade opening. Furthermore, at least one slidable component for openably closing the facade opening is provided, as well as at least one hardware according to one of the preceding examples, and a guide groove arrangement having a first guide groove in a first edge region of the opening edge and having a second guide groove in a second edge region of the opening edge opposite the first edge region. The at least one slidable component is provided with the at least one hardware. The slidable component is movably held with the eccentric bearing pins in the first and the second guide groove in a sliding direction. The slidable component can be pressed against the fixed opening edge by the eccentric bearing pins transversely to the sliding direction.

The slidable component is held in the guide grooves by the eccentric bearing pins. When pressed, the eccentric bearing pins are supported in the guide groove so that the slidable component can be pressed against the fixed opening edge transverse to the direction of the guide grooves.

According to an example, at least one handle device is provided according to the preceding example. At least one handle device is attached to the at least one slidable component and connected to the at least one hardware to actuate the at least one slidable component.

The term "actuating" includes moving, for example up or down, or right or left. The term "actuating" includes, in particular, pressing the component to seal it in the closed state and releasing it to open it.

According to an example, the slidable component is designed as a sliding window and/or a sliding door. The first and second guide grooves run linearly.

The linear design of the guide grooves is provided as an option.

In another example, the guide groove extends in a cranked manner at least in a region where the slidable component is in an at least partially open region.

In an example, a further component is provided in addition to the slidable component. For example, the further component is a further slidable component, i.e. a further sliding window or a further sliding door. For example, two slidable components are provided.

In another example, the further component is a fixed component, for example, a fixed window, such as a fixed window sash that can be opened only for cleaning purposes, or a fixed door element.

In an option, it is provided that the further component is arranged in a different plane than the slidable component. The movable component can be moved past the other component in a flat plane at a minimum distance. Due to the offset of the pressure process, the slidable component can still provide a circumferential sealing in the closed state.

According to an example, a sealing arrangement is provided at least in a partial area between the slidable component and the fixed edge of the opening: Pressing the slidable component against the fixed frame region causes the opening to be sealed. The sealing arrangement comprises elastic seals which are at least partially compressed by the pressing action.

The provision of elastic seals is provided as an option.

The term "sealing arrangement" refers to seals between the slidable component and a frame area. The seals can be formed as profiles or folds between the edges of the slidable component and the edges of the frame area. The seals can alternatively or additionally be formed as elastic seals which are at least partially compressed by the pressing action.

In an unpressed state, for example, the slidable component can be moved freely along the sealing arrangement, i.e. spaced apart.

For example, for pressing on, the slidable component can be offset by approx. 6 mm.

According to an example, a sealing arrangement is formed at least along the first side and the second side of the slidable component, forming with the fixed opening edge a sealing plane parallel to the plane of the slidable component.

The sealing arrangement can be pressed against transversely to the plane of the slidable component.

According to an example, the slidable component is a vertically slidable component. The first side is a first vertically extending longitudinal side of the slidable component, and the second side of the slidable component is a second vertically extending longitudinal side of the slidable component. The first guide groove and the second guide groove extend vertically.

The vertically slidable component is, for example, a vertically sliding window or door.

According to an example, the sealing arrangement that can be pressed against transversely to the plane of the slidable component is provided at least along the lateral edge regions. The sealing arrangement that can be pressed on transversely to the plane of the slidable component is provided in an upper edge region. In a lower edge region, a sealing is provided which can be pressed against a lower edge region in the vertical direction.

The sealing arrangement in the upper edge area is provided as an option. The formation of a sealing at the lower edge is provided as an option.

In an example, the press-on sealing assembly comprises a sealing that is attached to the vertically slidable component and that is pressed against a stop of the fixed opening rim when the vertically slidable component is closed.

In another example, as a wind driven rain sealing, a second sealing is additionally provided laterally, which is attached to the fixed opening edge and, in the closed state, is pressed against an edge region of the vertically slidable component.

In another example, the press-on sealing assembly includes a sealing that is secured to a stop of the fixed opening edge and that is pressed against an edge portion of the vertically slidable component when the vertically slidable component is closed.

According to an example, the slidable component is a horizontally slidable component. The first side is a horizontally extending lower side of the slidable component, and the second side of the slidable component is a horizontally extending upper side of the slidable component. The first guide groove and the second guide groove extend horizontally.

The horizontally slidable component is, for example, a horizontal sliding window or a horizontal sliding door.

According to an example, at least one of the eccentric bearing pins has a radially protruding projection on each side. A stop element is formed in the guide groove on one side of the groove, with which the radially projecting projection can be engaged by rotating the eccentric bearing pin. This allows the eccentric bearing pin to be supported on the stop element in order to effect a secondary pressing action parallel to the guide direction.

The secondary pressing, for example, causes the lower section of a vertically movable component to be pressed down.

The pressing of the slidable component transversely to the guide direction can also be referred to as a primary press-on.

In an example, a method is provided for moving a slidable component comprising a hardware according to one of the above examples.

In accordance with the invention, there is also provided a method for moving a movable facade component. The method comprises the following steps:

Guiding a slidable component by engaging guide pins designed as eccentric bearing pins in a guide groove arrangement; the slidable component is designed for openably closing a facade opening formed by a fixed opening edge. At least two guide pins are provided for a first side of the slidable component and at least two guide pins are provided for a second side of the slidable component opposite the first side. The guide groove arrangement has a first guide groove in a first edge region of the opening edge and a second guide groove in a second edge region of the opening edge opposite the first edge region. The eccentric bearing pins are each rotatably mounted on the slidable component with an eccentrically arranged axis of rotation and are in engagement with one of the guide grooves.

Actuating an actuating device coupled to drive rods; actuation of the actuating device causes longitudinal movement of the drive rods. The eccentric bearing pins are coupled to the drive rods via coupling elements and the longitudinal movement of the drive rods causes rotation of the eccentric bearing pins.

Rotating the eccentric bearing pins within the guide groove by the actuation of the actuation device; and thereby Pressing the slidable component against a fixed frame region transversely to the guide direction and moving the slidable component transversely to the guide direction.

In an option, the locking solutions are provided independently of the design of the eccentric bearing pins, i.e. without the eccentric bearing pins.

In an example, a hardware for a slidable facade component is provided, which has a guide pin arrangement for the slidable facade component with at least two guide pins for a first side of the slidable facade component and at least two guide pins for a second side of the slidable facade component opposite the first side. The hardware further comprises an actuating rod arrangement for transmitting an actuating force, comprising a first actuating rod for the first side of the slidable facade component and a second actuating rod for the second side of the slidable facade component. The hardware further comprises an actuating device coupled to the drive rod arrangement for transmitting the actuating force to the first and second drive rods with an actuation. The guide pins are provided for engagement with a guide groove arrangement disposed in the frame portion. At least one of the guide pins per side is formed as a locking pin with a locking disc having a receptacle for engagement with a locking bolt provided on a fixed frame portion. The locking pins are each coupled to one of the drive rods via a coupling element and are rotatable via a longitudinal movement of the drive rods.

In an example, the receptacle is formed as a continuous slot with two edge segments that are movable into the area of the locking pin such that movement of the slidable component along the guide groove is blocked.

In another example, the receptacle is formed as an entry slot with an edge segment that is movable in front of the locking pin such that movement of the slidable component along the guide groove is blocked.

In an example, at least one locking pin is provided on each of the first and second sides with the locking disc with inlet slot. The entry slot with the edge segment on the first side is formed as a mirror image of the entry slot with the edge segment on the second side. With the actuation, the first drive rod and the second drive rod are movable in opposite directions with respect to the slidable component.

In accordance with an aspect of the invention, a guide for a slidable facade component is provided which allows movement of the slidable facade component transversely to the sliding direction by an eccentric.

It should be noted that the features of the embodiments of the hardware also apply to embodiments of the facade and the method, and vice versa. In addition, those features can also be freely combined with each other where this is not explicitly mentioned.

BRIEF DESCRIPTION OF THE DRAWINGS

In the following, examples of embodiments of the invention are described in more detail with reference to the accompanying drawings.

DETAILED DESCRIPTION OF EMBODIMENTS

Figure 1:
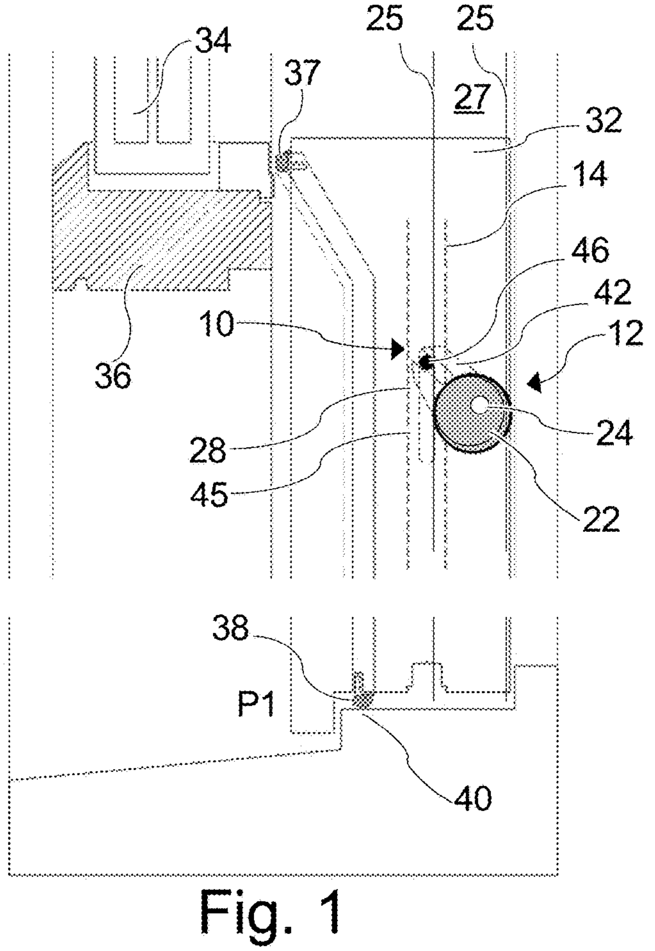
FIG. 1 shows an example of a hardware for a slidable facade component in connection with a vertical sliding window in a vertical section.

In FIG. 1, an example of a hardware 10 for a slidable facade component in connection with a vertical sliding window is shown in a vertical section. The hardware 10 has a guide pin arrangement 12 for the slidable facade component. The hardware 10 also has an operating rod arrangement 14 (indicated by dashed lines in FIG. 1) for transmitting an actuating force and an actuating device 16 (see FIG. 4).

The design of the slidable component as a sliding window is provided as an option. In another option, the slidable component is a sliding door.

The guide pin arrangement 12 comprises at least two guide pins 18*a* for a first side of the slidable facade component and at least two guide pins 18*b* for a second side of the slidable facade component opposite the first side. The drive rod arrangement 14 comprises at least one first drive rod 20*a* for the first side of the slidable facade component and a second drive rod 20*b* for the second side of the slidable facade component.

The actuating device 16 is coupled to the drive rod assembly 14 to transmit the actuating force to the first and second drive rods 20*a*, 20*b* with an actuation. The guide pins 18*a*, 18*b* are each formed as eccentric bearing pins 22 having an eccentrically disposed pivot axis 24 for rotatable attachment to the slidable facade component. The guide pins 18*a*, 18*b* are provided for engagement with a guide groove arrangement 26 arranged in the frame area (see FIG. 4). The guide groove arrangement has, for example, a guide groove 27. The guide groove 27 is indicated in FIG. 1 by two dashed side walls 25 of the guide groove 27. The eccentric bearing pins 22 are each coupled to one of the drive rods 20*a*, 20*b* via a coupling element 28. Due to the coupling element 28, the eccentric bearing pins 22 can be rotated via a longitudinal movement of the driving rods 20*a*, 20*b*. The guide pin arrangement 12 is configured to move the slidable facade component transversely to the guide direction by the eccentric bearing pins 22 supported in the guide groove arrangement 26, in order to cause the slidable facade component to be pressed against a fixed frame region transversely to the guide direction.

The guide groove 27 is provided, for example, on the side of the post frame.

The eccentric bearing pin 22 is supported on one side of the guide groove. This area forms an inner stop to push the sash outward against a stop.

The horizontal offset can be approx. 6 mm, for example.

Optionally shown in FIG. 1 is that the slidable component is a vertically slidable component. The first side is a first vertically extending longitudinal side of the slidable component, and the second side of the slidable component is a second vertically extending longitudinal side of the slidable component. The first guide groove and the second guide groove extend vertically.

As a further option, FIG. 1 shows that the sealing arrangement, which can be pressed on transversely to the plane of the slidable component, is provided at least along the lateral edge regions. The sealing arrangement that can be pressed on transversely to the plane of the slidable component can optionally also be provided in an upper edge region. As a further option, a sealing is provided in a lower edge region which can be pressed against a lower edge region in the vertical direction.

As another option, but not shown, it is provided that the slidable component is a horizontally slidable component. The first side is a horizontally extending lower side of the slidable component, and the second side of the slidable component is a horizontally extending upper side of the slidable component. The first guide groove and the second guide groove extend horizontally.

Figure 2:
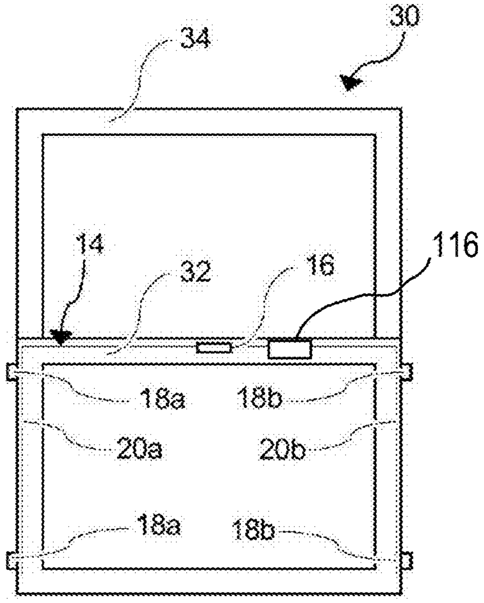
FIG. 2 shows an example of a slidable facade component in a schematic view.

FIG. 2 schematically shows a view of a vertical sliding window 30 as an example of a slidable facade component, in which a lower sash 32 and an upper sash 34 are provided. At least the lower sash 32 is held vertically slidable. For example, the first side is the left side, and the second side is the right side. Schematically indicated are the two guide pins 18*a* on the first/left side and the two guide pins 18*b* on the second/right side.

The slidable facade component serves to openably close an opening in the building envelope and, in addition to being designed as a window with a translucent, e.g. transparent or translucent filling, can also be designed as an opaque surface, for example.

The slidable facade component, in particular the frame profiles, and the adjacent fixed frame structure can be made of materials such as wood materials, plastics and metal materials, and composite materials. In other examples, a combination of these materials is provided.

In FIG. 1, a lower sash frame profile 36 of the upper sash 34 is indicated. The left side of the upper sash in FIG. 1 faces outward and the right side of the upper sash in FIG. 1 faces inward. In FIG. 1, the lower sash 32 is indicated, which is located on the inside of the upper sash and can be moved upward past the upper sash. Counterbalancing mechanisms to compensate for the sash's own weight are provided but are not shown further.

In FIG. 1, the lower sash 32 is in a first position P1, in which the sash closes the opening but is not yet in its final position. The first position P1 shown in FIG. 1 can also be referred to as the secondary closing position. A sealing 38 provided on the lower sash still has a distance to a fixed frame area 40.

Another sealing 37 is provided at the top edge, which abuts the other wing.

As an option, a sealing arrangement is provided at least in a partial area between the slidable component and the fixed edge of the opening. Pressing the slidable component against the fixed frame area causes the opening to be sealed. For example, the sealing arrangement comprises elastic seals which are at least partially compressed by the pressing action.

In an option, a sealing arrangement is formed along at least the first side and the second side of the slidable component to form a sealing plane with the fixed opening edge that is parallel to the plane of the slidable component.

By actuating the eccentric bearing pins 22, the sash in FIG. 1 can be moved slightly to the left to press the sealing 38 against the stop. In doing so, the sealing initially rests in a second position P2, and then the elastic sealing is compressed slightly in a third position P3. The third position P3 can also be referred to as the primary closing position.

As an option, FIG. 1 shows that the guide groove is linear, for example, the first and second guide grooves are linear.

Figure 3A:
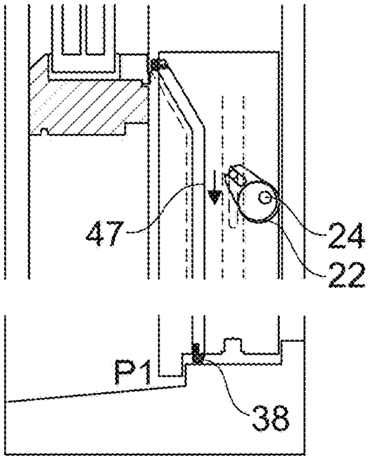
FIGS. 3A, 3B and 3C show the example from FIG. 1 in three different positions.

In FIG. 3A, the first position P1 is shown once again, in which the sash can still be moved vertically.

Figure 3B:
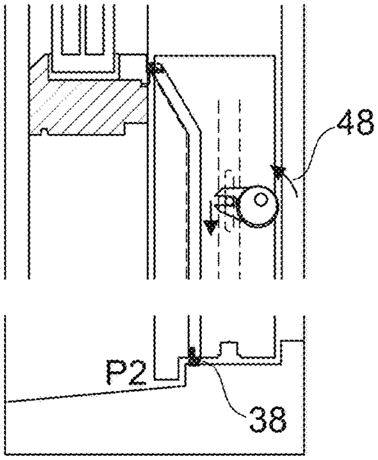

FIG. 3B shows the second position P2, in which the sash rests against the sealing but can actually still be moved vertically.

Figure 3C:
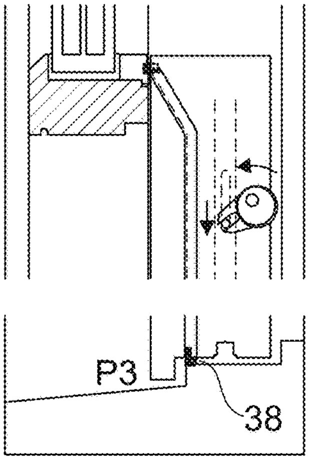

FIG. 3C shows the third position P3, in which the vane rests against the sealing, compressing it and making it impossible, or at least very difficult, to move it vertically.

Optionally, the coupling member 28 is shown to include a lever 42 projecting from the eccentric bearing pin 22 and having a slot 44 for engagement with a pin 46 attached to the drive rod 20*a*. A longitudinal hole 45 indicates the range of motion of the pin 46.

When the window is operated to close, for example, the drive rod 20*a* is moved via a handle element. This also moves the bolt 46. From FIG. 3A to FIG. 3B to FIG. 3C, the bolt 46 is moved downward, as indicated by a first arrow 47. This causes the eccentric bearing pin 22 to rotate counterclockwise about the axis of rotation 24, indicated by a first rotational arrow 48. This causes the eccentric bearing pin 22 to extend further to the right.

Figure 4:
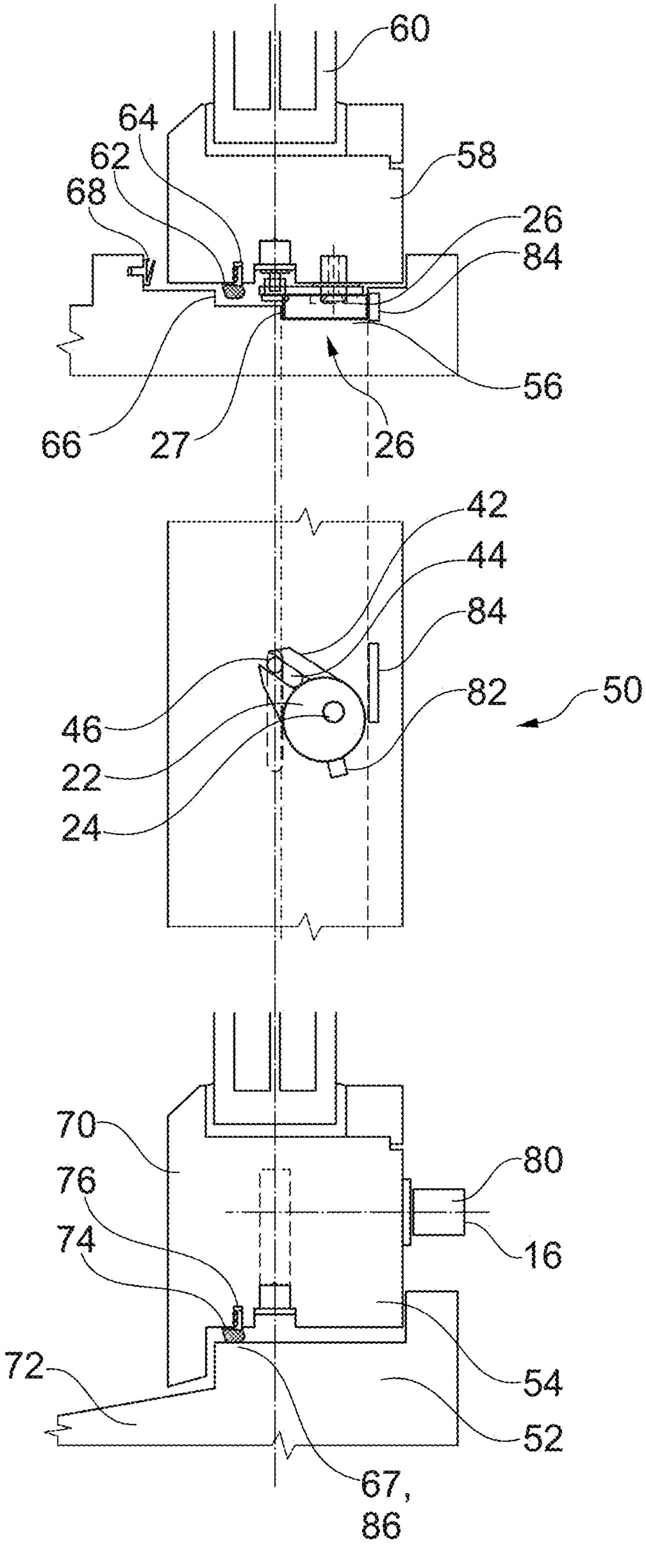
FIG. 4 shows another example of a hardware for a slidable facade component in connection with a vertical sliding window in a horizontal section (top), a side view (middle) and a vertical section (bottom).

FIG. 4 shows another example of a hardware for a slidable facade component in connection with a vertical sliding window in a horizontal section (top), a side view (middle) and a vertical section (bottom).

In FIG. 4, a facade system 50 is shown as an option that has a fixed opening edge 52 that forms a facade opening. The fixed opening edge 52 is formed, for example, by fixed frame profiles. The facade system 50 comprises at least one slidable component 54 for openably closing the facade opening, for example the lower sash 32 of the vertical sliding window 30. Furthermore, the hardware 10 according to one of the preceding examples is provided. The guide groove arrangement 26 includes a first guide groove 56 in a first edge region of the opening edge 52. The at least one slidable component is provided with the at least one hardware. In addition, a second guide groove (not shown) is provided in a second edge region of the opening rim opposite the first edge region. The slidable component is movably held in a sliding direction by the eccentric bearing pins 22 in the first and second guide grooves. The slidable component can be pressed against the fixed opening edge by the eccentric bearing pins transverse to the sliding direction.

In the upper part, FIG. 4 shows the fixed opening edge 52 in horizontal section and a side sash profile 58 of the lower sash 32. For example, thermal glazing 60 is provided.

A lateral sealing 62 is held in a groove 64 on the lateral sash profile 58. A sealing stop 66 for the lateral sealing 62 is formed on the fixed opening edge 52. As a further option, a lateral wind driven rain sealing 68 can also be provided. The lateral sealing 62 can also be referred to as part of a main sealing.

The sealing stop 66 on the frame can extend outwardly at an angle at the upper portion of the sash to provide a transition of the sealing to the upper sash there.

The sealing can also be attached in reverse, i.e. to the fixed frame instead of to the slidable component.

In the middle section, FIG. 4 shows a side view of the eccentric bearing pin 22 with the lever as a coupling element.

In the lower portion, a vertical section of a lower sash profile 70 of the lower sash 32 is shown in FIG. 4. Also shown is a lower profile segment 72 of the fixed opening edge 52.

A lower sealing 74 is held in a groove 76 on the lower sash profile 70. On the lower profile segment 72, a profile surface serves as a stop 78 for the lower sealing 74. The lower sealing 74 can also be referred to as part of a main sealing.

In FIG. 4, a handle 80 for the actuating device 16 is also indicated in the lower part.

Figures 5A, 5B, 5C:
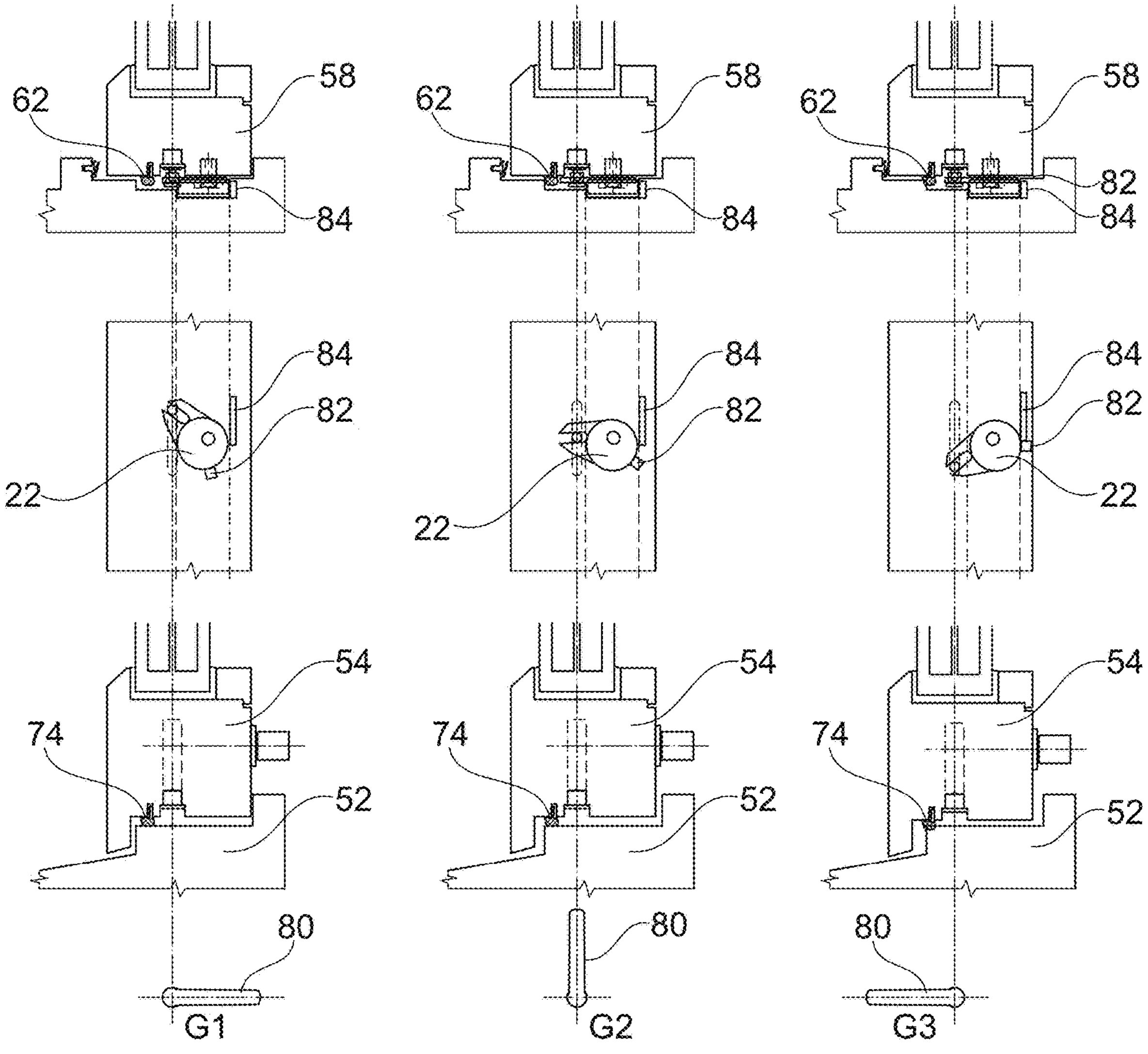
FIGS. 5A, 5B and 5C show the example from FIG. 4 in three different positions.

In FIG. 5A, FIG. 5B and FIG. 5C, the handle 80 is shown separately below the vertical section in the lower part. In FIG. 5A, the handle 80 is shown in a first handle position G1. In FIG. 5B, the handle 80 is shown in a second handle position G2. In FIG. 5C, the handle 80 is shown in a third handle position 31. The first handle position can also be referred to as an open handle position. The second handle position can also be referred to as a sealed handle position or a semi-sealed handle position. The third handle position can also be referred to as a locked and sealed handle position.

In the first handle position G1, the sash can be moved, for example by lifting or lowering it at the handle 80 itself. In the second handle position G2, the sash is increasingly pressed against the sealing in a direction transverse to the sliding direction. In the third handle position G3, the sash is pressed against the sealing transverse to the sliding direction so that a reliable sealing is provided.

In an example not shown in further detail, the actuation has a counter-rotating gear 116. With the counter-rotating gear 116, the first drive rod and the second drive rod can be moved in the same direction in relation to the movable component during actuation.

In FIGS. 5A, 5B and 5C, the example from FIG. 4 is shown in three different positions. FIG. 5A shows the first position P1, FIG. 5B shows the second position P2 and FIG. 5C shows the third position P3.

In FIG. 4, as a further option, at least one of the eccentric bearing pins 22 has a radially projecting projection 82 on each side of the slidable component. A stop element 84 is formed in the guide groove 27 on one side of the groove, with which the radially projecting projection 82 can be engaged by rotating the eccentric bearing pin 22. This allows the eccentric bearing pin 22 to bear against the stop element 84 to effect secondary pressing parallel to the guide direction, for example downward.

This is shown, for example, in FIG. 5A, FIG. 5B and FIG. 5C. By turning the eccentric bearing pin 22 counterclockwise, the radially projecting projection 82 engages the stop element 84 from below, i.e. rests against it, in order to then press the sash downwards in a vertical direction into the sealing.

For example, a lowering of approx. 2 mm can take place so that the sealing is in contact, and a further lowering of approx. 1 mm so that the sealing is compressed.

In the first grip position G1, there is still no contact between the radially projecting projection 82 and the stop element 84. In the second grip position G2, abutting then occurs. In the third grip position G3, the sash is then pressed down so that a reliable sealing is also provided in the lower area.

If a gearbox without counter-rotation deflection is used for the operation, the rotation of the window handle moves the push rod in the same direction on all sides of the frame; either to the right or to the left, or clockwise or counter-clockwise. To enable locking even with this hardware configuration, an eccentric plate with a locking disc is mounted, for example, next to the lowest sliding bolt mounted on the side of the push rod. This locking disk can provide locking of the sash to the post frame during both upward and downward movement of the push rod. By turning the locking disc to the right or to the left, the locking disc mounted on the sliding sash engages around a locking bolt fixedly mounted on the post frame. The sliding sash can only be moved again after the connection has been released.

Optionally, at least one of the eccentric bearing pins is formed with a locking mechanism 100. For this purpose, for example, a locking disc 102 is provided having a receptacle 104 for engagement with a locking pin 106 provided on a stationary frame portion.

Figure 6:
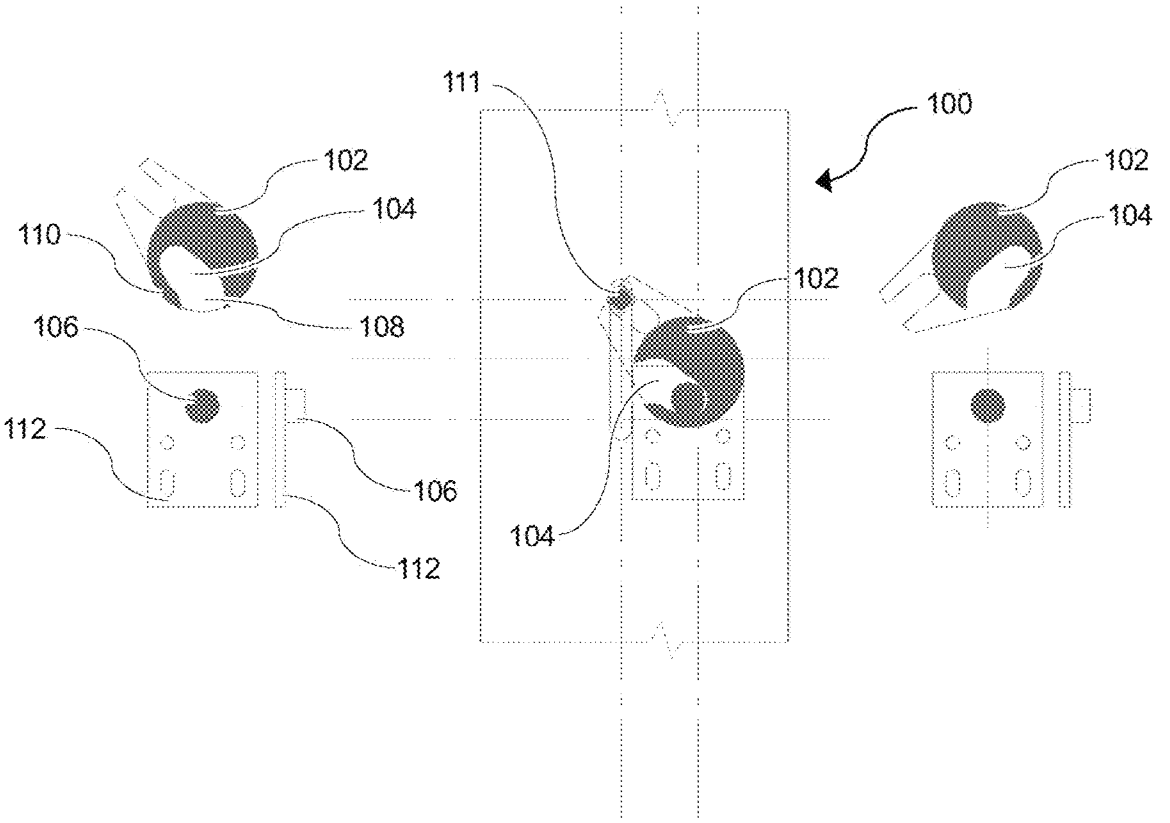
FIG. 6 shows an example of a hardware for a slidable facade component with a locking disc in a side view for a left side of the slidable facade component (left) and a right side of the slidable facade component (right); in the center, the locking is shown referring to the right side.

In FIG. 6, an example is shown in which the receptacle 104 of the locking disk 102 is formed as an inlet slot 108 with an edge segment 110 that can be moved in front of the locking bolt 106 by rotating the locking disk 102 in such a way that movement of the slidable component along the guide groove is blocked.

FIG. 6 shows the locking disc 102 in a side view for a left side of the slidable facade component (left) and a right side of the slidable facade component (right); the locking is shown in the center based on the right side.

For example, a drive pin 111 is provided on a drive rod to rotate the locking disc 102.

For example, the sash is lowered from above. The locking disc 102, which is rotatably mounted on the sash, is moved from above toward the locking bolt 106, which is attached to a side fixed frame member. For example, the locking bolt 106 is attached to a plate 112. In an embodiment, the locking bolt 106 is attached directly to the frame without the plate 112. The locking bolt 106 dips into the inlet slot 108. By rotating the locking plate 102, for example via one of the driving rods that is present anyway, the edge segment 110 can be rotated in front of the locking bolt 106. The term "forward" as used herein refers to the relative path of movement that the sash can move in relation to the locking pin 106.

In an option, it is provided that at least one eccentric bearing pin is provided on each of the first and second sides with the locking disc with the inlet slot. The entry slot with the edge segment is formed on the first side as a mirror image of the entry slot with the edge segment on the second side. With the actuation, the first drive rod and the second drive rod can be moved in opposite directions with respect to the slidable component.

By forming the contour of the inlet slot 108 in a mirrored manner, the rotation of the locking disk 102 can also be "mirrored". For example, if the drive rod is driven by a gear in only one direction, a downward movement of the drive pin 111 occurs on one side, e.g., the left side, and an upward movement occurs on the other side, e.g., the right side.

On the left side, downward movement of the drive pin 111 causes the locking disk 102 to rotate counterclockwise.

On the right side, movement of the drive pin 111 upward causes clockwise rotation of the locking disk 102.

However, in both cases, the mirrored contour of the locking disc allows positive locking to be achieved by engaging behind the locking pin 106.

In another option, it is provided that the locking discs are formed identically on both sides and with the actuation, e.g. a handle and a gear, the first driving rod and the second driving rod can be moved in the same directions with respect to the slidable component.

Figure 7:
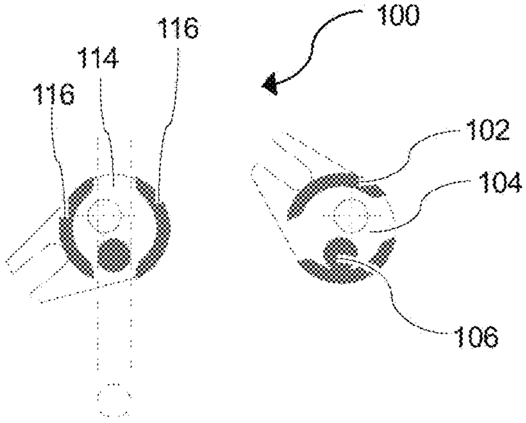
FIG. 7 shows another example of a locking disc in a side schematic view.
Figure 8:
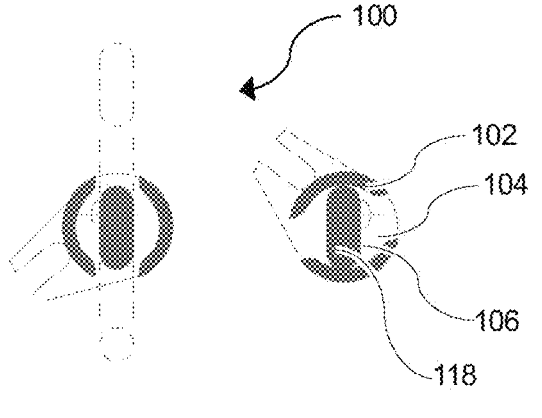
FIG. 8 shows another example of a locking disc.

In FIG. 7 and FIG. 8, two further examples of the locking disc 102 are shown in lateral schematic views. The receptacle 104 of the locking disc 102 is formed as a continuous slot 114 with two edge segments 116, which can be moved into the area of the locking pin 106 in such a way that movement of the slidable component along the guide groove is blocked.

This also allows, for example, additional locking pins 106 to be arranged at intermediate positions over which the locking disc 102 can be moved when in the appropriate rotational position.

In an example, locking discs open on both sides (top and bottom) are provided. A locking disk open on both sides can also be designed, for example, several times one above the other.

During the upward or downward movement of the slidable sash, the locking bolt, which is permanently mounted on the post frame, is passed through the locking disk, for example. The locking bolt can be mounted e.g. several times on top of each other on the post frame.

In a variation, oval locking bolts are provided. The use of oval locking bolts combined with open locking disc can e.g. fix the sash in different positions (use for e.g. gap ventilation). The oval locking bolt can be combined with round locking bolts, for example.

In FIG. 7, in a first example, the locking pin 106 is formed with a circular cross-section.

In FIG. 8, in a second example, the locking pin 106 is formed with an elongated cross-section 118. This allows for better retention of the sash when in the locked position.

The locking solutions shown in FIG. 6, FIG. 7 and FIG. 8 are actuated by a handle provided on the sash, for example at the top, bottom or side, and coupled to a gearbox.

In an example, the locking solutions shown are operated with a co-rotating standard gear unit. In case of the co-rotating standard gear unit, the bolts permanently mounted on the drive rods move in the same direction, for example—in relation to the window sash—clockwise or counterclockwise. The movement is synchronous, for example.

In another example, the locking solutions shown are operated with a counter-rotating gear. In case of the counter-rotating gear unit, the bolts permanently mounted on the drive rods move in a mirrored direction of movement with respect to the two sides (top/bottom or right/left), for example upwards or downwards in case of a lateral arrangement, or to the right or left in case of an arrangement at the top and bottom. The movement is synchronous, for example.

Figure 9:
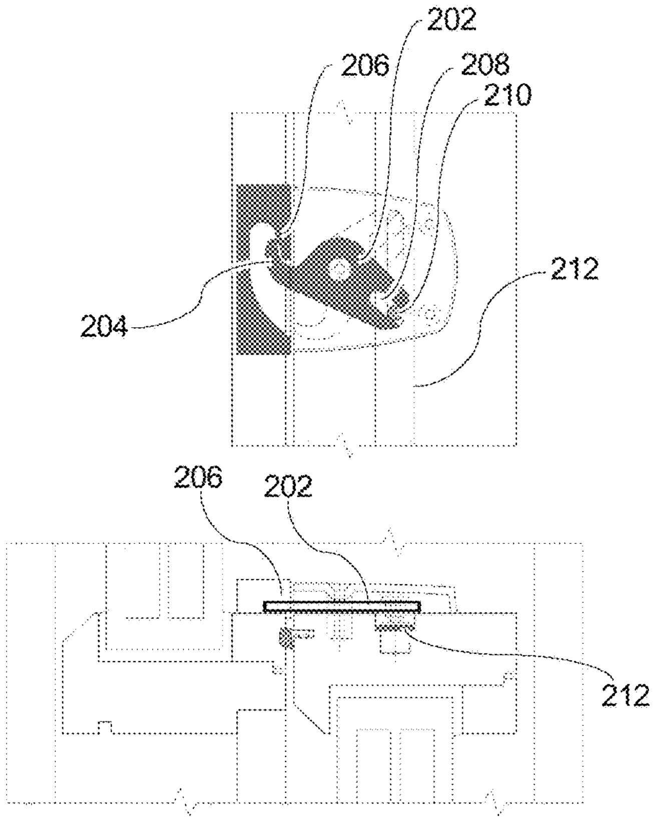
FIG. 9 shows an example of a closure arrangement in a top view (top) and a vertical section (bottom).

In FIG. 9, an example of an additional closure arrangement 200 is shown in a top view (top) and a vertical section (bottom). The closure assembly 200 includes a rotatably mounted rotary latch 202 having a hook 204 at a first end for engaging a closure plate 206 secured to a fixed frame portion, and having a slot 208 at a second end opposite the first end for engaging a pin 210 secured to a drive rod 212. The rotatably mounted rotary latch 202 is driven by a drive rod in the same manner as the laterally disposed coupling members 28 and levers 42, respectively. Since the drive rod 212 can be driven by the same handle, a one-handed operation is provided to simultaneously perform the sealing (pressing on the seals) and locking/unlocking functions.

Figure 10:
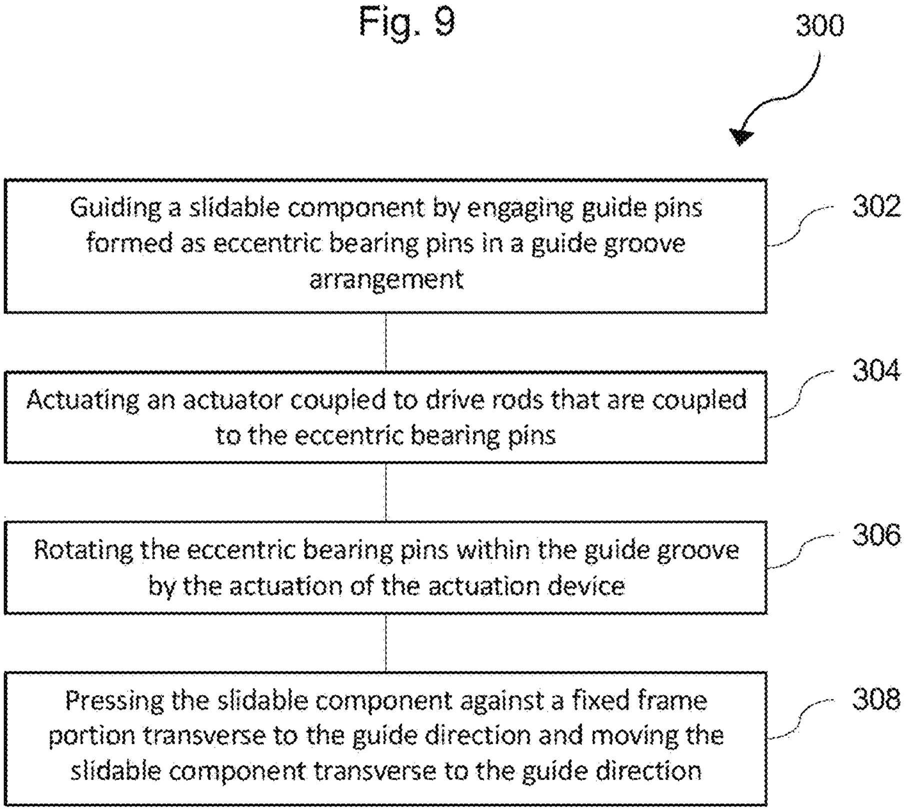
FIG. 10 shows an example of a method for moving a movable facade component.

FIG. 10 shows an example of a method 300 for moving a movable facade component. The method has the following steps.

In a first step 302, also referred to as step a), a slidable component is guided in a guide groove arrangement by engaging guide pins formed as eccentric bearing pins. The slidable component is configured for openably closing a facade opening formed by a fixed opening edge. At least two guide pins are provided for a first side of the slidable component and at least two guide pins are provided for a second side of the slidable component opposite the first side. The guide groove arrangement has a first guide groove in a first edge region of the opening edge and a second guide groove in a second edge region of the opening edge opposite the first edge region. The eccentric bearing pins are each rotatably mounted on the slidable component with an eccentrically arranged axis of rotation and are in engagement with one of the guide grooves.

In a second step 304, also referred to as step b), an actuating device coupled to drive rods is actuated. Actuation of the actuating device causes longitudinal movement of the drive rods. The eccentric bearing pins are coupled to the drive rods via coupling elements, and the longitudinal movement of the drive rods causes the eccentric bearing pins to rotate.

In a third step 306, also referred to as step c), the eccentric bearing pin is rotated within the guide groove by actuation of the actuator.

In a fourth step 308, also referred to as step d), the slidable component is pressed against a stationary frame region transverse to the guiding direction and the slidable component is moved transverse to the guiding direction.

The guiding, actuating, turning, pressing as well as moving all take place almost simultaneously, in an example.

FIG. 11*a*, FIG. 11*b*, FIG. 11*c*, and FIG. 11*d* show an example of an adapter attachment 120 having a coupling member 122 and an eccentric bearing pin 124.

The coupling element 122 is formed as a releasable connection between the eccentric bearing pin 124 and the drive rod (not shown). The coupling element 122 can be coupled to a pin attached to the drive rod (see reference numeral 46 in FIG. 1 or FIG. 4).

Optionally, coupling member 122 and eccentric bearing pin 124 are shown to be integrally formed. The adapter attachment 120 includes a first region 126 having a circular outer contour 128. The adapter attachment 120 also includes a second region 130 having a slot 132 for insertion of a free end of a bolt. The adapter attachment 120 includes a hole 134 eccentric to the round outer contour 128 for rotatably attaching the adapter attachment 120 to a frame segment of the slidable facade component.

The adapter attachment 120 is made of plastic, for example.

The coupling element 122 and the eccentric bearing pin 124 form a gear for converting a longitudinal movement of a drive rod extending parallel to the plane of the movable facade component into a movement of the movable facade component directed transversely to the plane of the movable facade component.

Figure 11A:
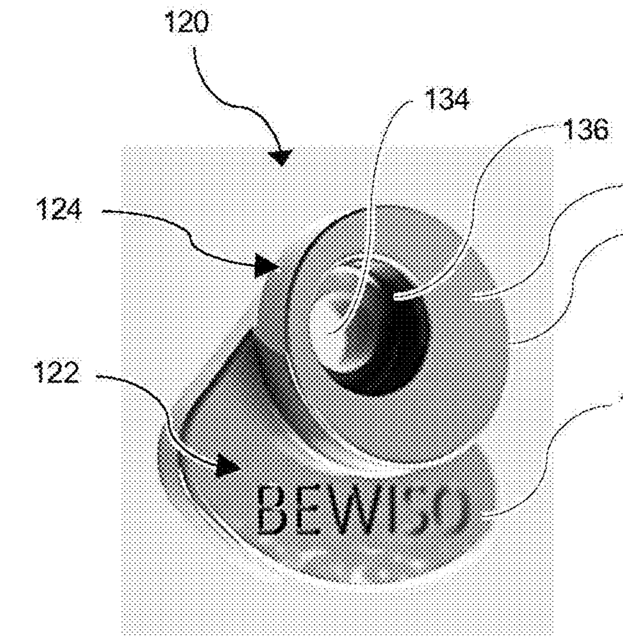
FIG. 11*a*, FIG. 11*b*, FIG. 11*c* and FIG. 11*d* show an example of an adapter attachment with a coupling element and an eccentric bearing pin.

In FIG. 11*a*, the round outer contour 128 is visible, with the coupling element 122 provided behind it. The bore has, for example, a flare 136 for receiving a screw head.

Figure 11B:
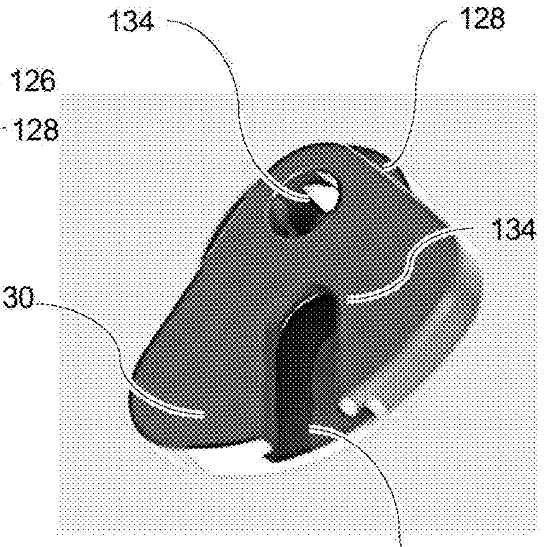

FIG. 11*b* shows the other side with slot 132.

Figure 11C:
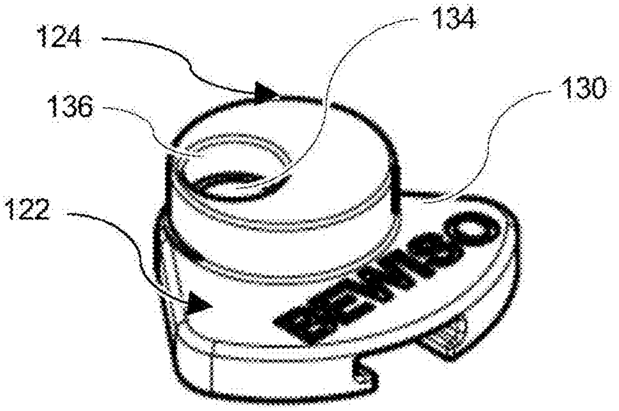
Figure 11D:
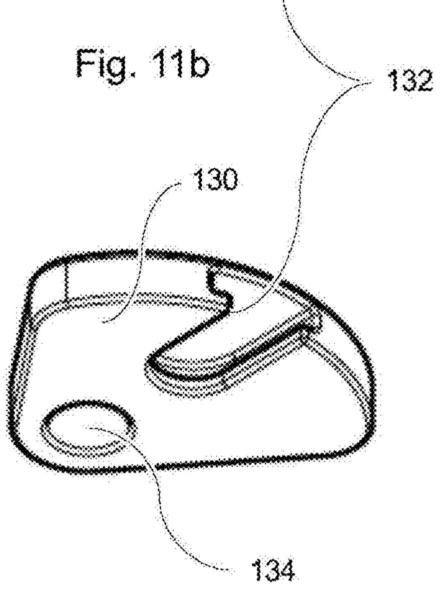

FIG. 11*c* shows a similar illustration to FIG. 11*a*.

FIG. 12*a*, FIG. 12*b*, FIG. 12*c*, FIG. 12*d*, and FIG. 12*e* show an example of an insert 140 for engaging the guide groove arrangement disposed in the frame region and for coupling with the eccentric bearing pin. The insert 140 has a circular receptacle 142 for the eccentric bearing pin 124 and is formed with at least one outer linear longitudinal edge 144 as a contact surface in the guide groove arrangement. The insert 140 is made of plastic, for example.

In the example, two of the parallel outer linear longitudinal edges 144 are shown.

Spring regions 146 are formed on at least one side of the parallel outer linear longitudinal edges 144, which resiliently project beyond an abutment region 148 of the longitudinal edges 144 in the direction of the cross-section of the guide groove assembly. The spring regions protrude in the longitudinal direction of the guide groove assembly.

Optionally, it is provided that a spring force of the spring sections can be adjusted to set a contact pressure of the lateral cantilevers for generating a braking effect. FIG. 12 also shows another example of the adapter attachment 120.

Figure 12A:
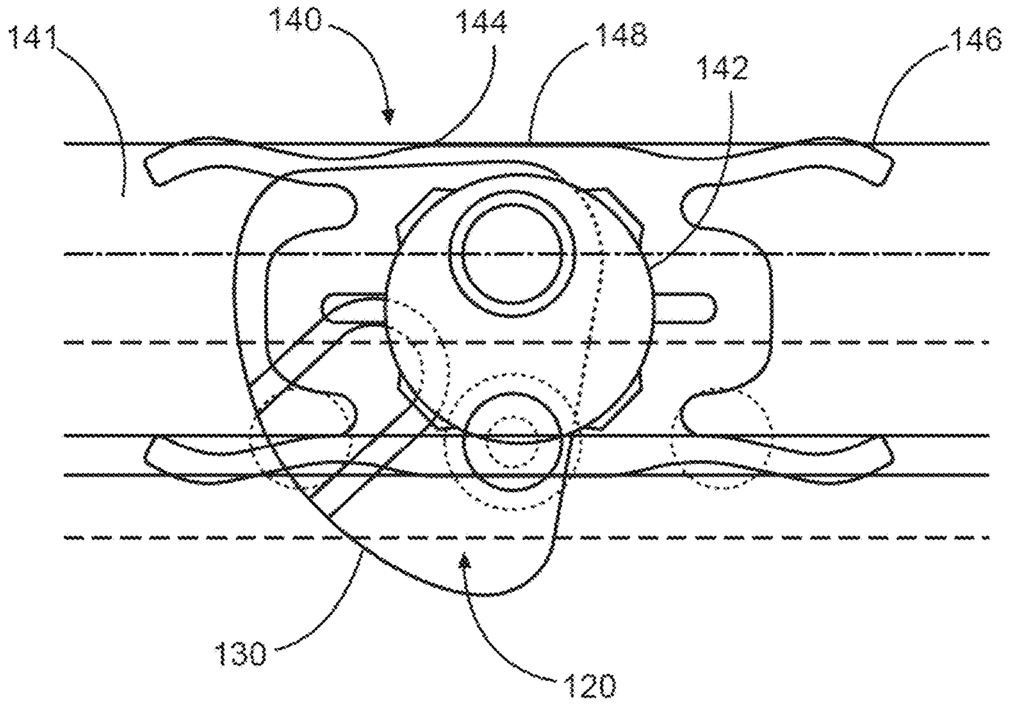
FIG. 12*a*, FIG. 12*b*, FIG. 12*c*, FIG. 12*d*, and FIG. 12*e* show an example of an insert for engaging the guide groove assembly located in the frame area in conjunction with the adapter attachment of FIGS. 11*a*-11*d*.

FIG. 12*a* shows a top view of the insert 140 in a groove 141 with an example of the adapter attachment 120 held in the insert 140.

Figure 12B:
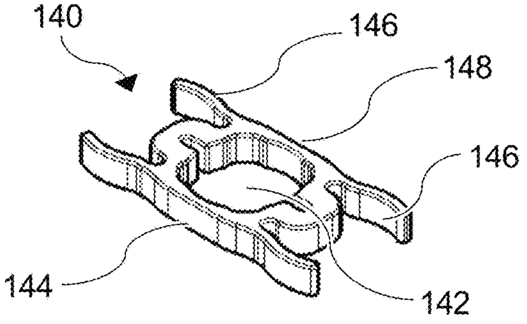

In FIG. 12*b*, the insert 140 is shown in an oblique view.

Figure 12C:
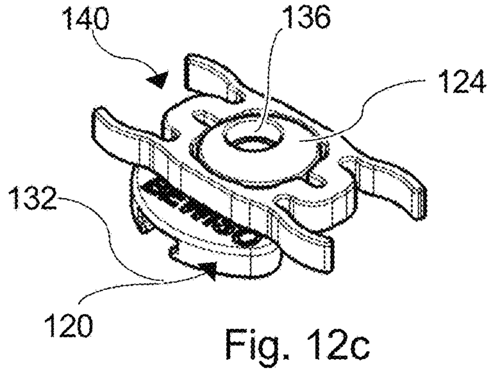

In FIG. 12*c*, the insert 140 is shown in an oblique view with the adapter attachment 120 inserted.

Figure 12D:
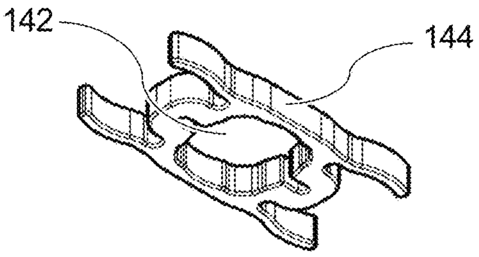

In FIG. 12*d*, the insert 140 of FIG. 12*b* is shown in a different oblique view.

Figure 12E:
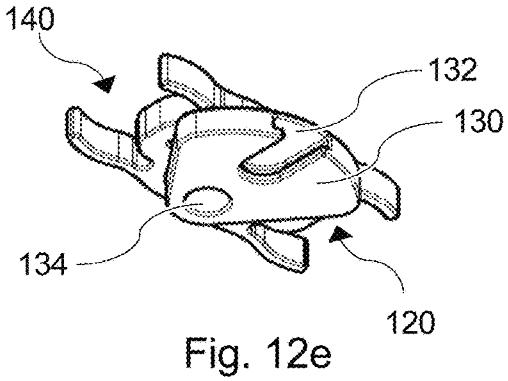

In FIG. 12*e*, the insert 140 of FIG. 12*b* is shown in another oblique view.

Figure 13A:
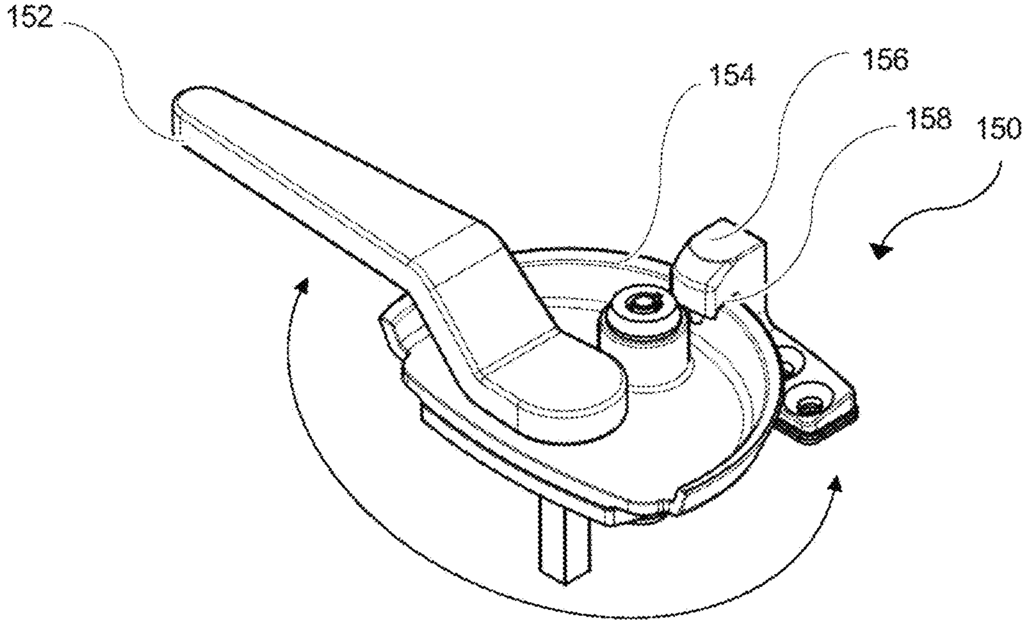
FIG. 13*a*, FIG. 13*b* and FIG. 13*c* show an example of a handle device.
Figure 13B:
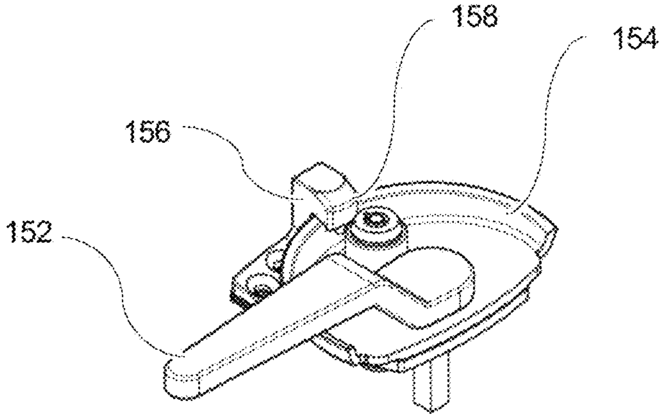
Figure 13C:
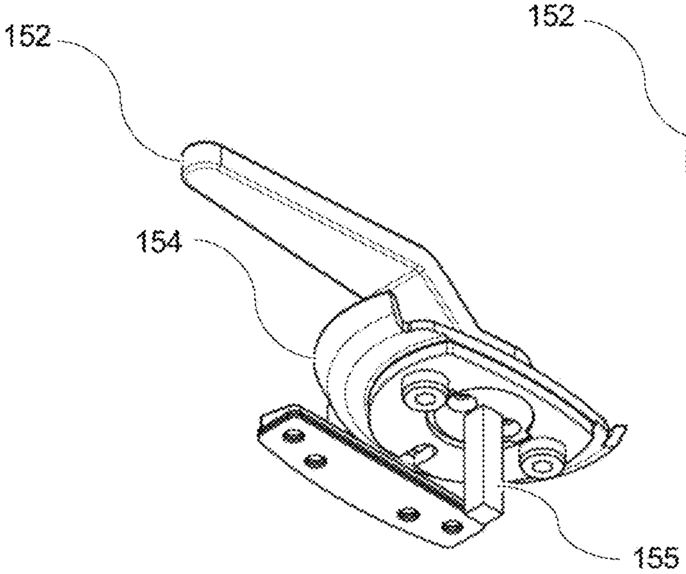

FIG. 13*a*, FIG. 13*b*, and FIG. 13*c* show an example of a handle assembly 150. The handle assembly 150 includes a handle 152 rotatably mounted between a first position and a second position through approximately 180°, and an edge contour 154 connected to the handle 152. A double arrow indicates movement for opening and closing. The handle 152 can be connected to an driving rods arrangement, for transmitting an actuating force for a hardware according to one of the preceding examples. For example, a square 155 protrudes from the bottom surface. The edge contour 154 has an edge projecting axially transverse to the direction of rotation, and is configured to engage a fixed counterpart 156 for locking. The fixed counterpart 156 has a downwardly pointing projection 158, which is engaging behind by the edge contour 154. The axially projecting edge, or edge contour 154, has an elliptical contour in the direction of rotation.

In FIG. 13*a*, the handle device 150 is shown in an oblique view from above.

In FIG. 13*b*, the handle device 150 is shown in an oblique view from another side.

In FIG. 13*c*, the handle device 150 is shown in an oblique view from below.

In another example, see also FIG. 2, a handle device according to one of the preceding examples is provided. The at least one handle device is attached to the at least one slidable component and connected to the at least one hardware to actuate the at least one slidable component.

The embodiments described above can be combined in various ways. In particular, aspects of the devices can also be used for the embodiments of the method and vice versa.

Supplementally, it should be noted that "comprising" does not exclude other elements or steps, and "one" or "a" does not exclude a plurality. It should further be noted that features or steps that have been described with reference to any of the above embodiments can also be used in combination with other features or steps of other embodiments described above. Reference signs in the claims are not to be regarded as a limitation.

The invention claimed is:

1. A hardware for a slidable facade component, the hardware comprising:

a guide pin arrangement for the slidable facade component, having at least two guide pins for a first side of the slidable facade component and at least two guide pins for a second side of the slidable facade component opposite the first side;

an actuating rod arrangement for transmitting an actuating force, comprising a first actuating rod for the first side of the slidable facade component and a second actuating rod for the second side of the slidable facade component;

an actuating device coupled to the actuating rod arrangement for transmitting the actuating force to the first and second actuating rods with one actuation;

wherein the guide pins are each formed as eccentric bearing pins with an eccentrically arranged axis of rotation for rotatable attachment to the slidable facade component and are provided for engagement with a guide groove arrangement arranged in the frame region, wherein each eccentric bearing pin is a round disc with the axis of rotation arranged eccentrically relative to the round disc, wherein each eccentric bearing pin is configured to be arranged between two sidewalls of a corresponding guide groove of the guide groove arrangement;

wherein the eccentric bearing pins are each coupled to one of the drive rods via a coupling element and are rotatable via a longitudinal movement of the drive rods, wherein the coupling element has a slot configured for engagement with a corresponding pin attached to corresponding one of the drive rods, wherein the slot is defined by first and second operational edge sections parallel to one another and is configured to receive the corresponding pin between the first and second operational edge sections;

wherein the guide pin arrangement is configured to move the slidable facade component transversely to the guide direction by the eccentric bearing pins supported in the guide groove arrangement, in order to cause the slidable facade component to be pressed against a fixed frame region transversely to the guide direction, and wherein, in an operational state, the eccentric bearing pins are configured to urge against a corresponding surface, thereby pushing the slidable façade component away from the corresponding surface.

2. The hardware according to claim 1, wherein the coupling element is formed as a releasable connection between the eccentric bearing pin and the drive rod; and wherein the coupling element is couplable to a pin attached to the drive rod.

3. The hardware according to claim 1, wherein the coupling element and the eccentric bearing pin are integrally formed as an adapter attachment;

wherein the adapter attachment comprises a first portion having the circular outer contour and a second portion having a slot for insertion of a free bolt end; and wherein the adapter attachment includes a bore eccentric to the circular outer contour for rotatably attaching the adapter attachment to a frame segment of the slidable facade component.

4. The hardware according to claim 3, wherein the adapter attachment is made of plastic.

5. The hardware according to claim 1, wherein the coupling element and the eccentric bearing pin form a transmission for converting a longitudinal movement of a drive rod extending parallel to the plane of the slidable facade component into a movement of the slidable facade component directed transversely to the plane of the slidable facade component.

6. The hardware according to claim 1, wherein the coupling element is a lever projecting from the eccentric bearing pin and having the slot for engagement with the corresponding pin attached to the drive rod.

7. The hardware according to claim 1, wherein the actuation comprises a counter-rotating gear, and with the actuation the first drive rod and the second drive rod are movable in the same direction with respect to the slidable component.

8. The hardware according to claim 1, wherein at least one of the eccentric bearing pins is formed with a locking disc having a receptacle for engagement with a locking pin provided on a fixed frame portion; and wherein the receptacle:

i) is formed as a continuous slot having two edge segments movable into the region of the locking pin such that movement of the slidable component along the guide groove is blocked; or ii) is formed as an entry slot having an edge segment movable in front of the locking pin such that movement of the slidable component along the guide groove is blocked.

9. The hardware according to claim 8, wherein at least one eccentric bearing pin is provided on each of the first side and the second side with the locking disc having an entry slot;

wherein the entry slot with the edge segment on the first side is formed as a mirror image of the entry slot with the edge segment on the second side; and wherein, upon actuation, the first drive rod and the second drive rod are movable in opposite directions with respect to the slidable component.

10. The hardware according to claim 1, further comprising a locking assembly comprising a rotatably mounted rotary latch having a hook at a first end for engaging a locking plate secured to a fixed frame portion, and having a slot at a second end opposite the first end for engaging a bolt secured to the drive rod.

11. The hardware according to claim 1, further comprising an insert configured to engage the guide groove arrangement disposed in the frame region and to couple with the eccentric bearing pin;

wherein the insert has a receptacle for the eccentric bearing pin and is formed with at least one outer linear longitudinal edge as an abutment surface in the guide groove arrangement; and wherein the insert is made of plastic.

12. The hardware according to claim 11, wherein the insert comprises:

two of the outer linear longitudinal edges which are parallel; and spring portions formed on the parallel outer linear longitudinal edges on at least one side, the spring portions resiliently projecting beyond an abutment portion of the longitudinal edges in the direction of the cross-section of the guide groove assembly; and wherein the spring portions are projecting in the longitudinal direction of said guide groove arrangement.

13. A facade system comprising:

a fixed opening edge forming a facade opening;

at least one slidable component for opening and closing the facade opening;

at least one hardware according to claim 1; and a guide groove arrangement having a first guide groove in a first edge region of the opening edge and having a second guide groove in a second edge region of the opening edge opposite the first edge region;

wherein the at least one slidable component is provided with the at least one hardware;

wherein the slidable component is movably held with the eccentric bearing pins in the first and the second guide groove in a sliding direction; and wherein the slidable component is configured to be pressed against the fixed opening edge by the eccentric bearing pins transversely to the sliding direction.

14. The façade system according to claim 13, further comprising at least one handle assembly comprising:

a handle rotatably mounted between a first position and a second position through approximately 180°; and an edge contour connected to the handle;

wherein the handle is connectable to an actuating rod assembly for transmitting an actuating force for the at least one hardware;

wherein the edge contour has an axially projecting edge transverse to the direction of rotation and is configured to engage a fixed mating member for locking; and wherein the axially projecting edge has an elliptical contour in the direction of rotation; and wherein the at least one handle device is attached to the at least one slidable component and is connected to the at least one hardware to actuate the at least one slidable component.

15. The façade system according to claim 13, wherein said slidable component is formed as a sliding window and/or a sliding door; and wherein the first and second guide grooves are linear.

16. The façade system according to claim 13, further comprising a sealing arrangement in at least a portion between the slidable component and the fixed edge of the opening;

wherein pressing the slidable component against the fixed frame portion effects a sealing of the opening; and wherein said sealing arrangement comprises resilient sealings at least partially compressed by said pressing.

17. The façade system according to claim 13, further comprising a sealing arrangement formed at least along the first side and the second side of the slidable component, the sealing arrangement forming with the fixed opening edge a sealing plane which is parallel to the plane of the slidable component.

18. The façade system according to claim 13, wherein the slidable component is a vertically slidable component, wherein the first side is a first vertically extending longitudinal side of the slidable component; and wherein the second side of the slidable component is a second vertically extending longitudinal side of the slidable component; and wherein the first guide groove and the second guide groove extend vertically.

19. The façade system according to claim 13, further comprising a sealing arrangement pressable transversely to the plane of the slidable component at least along the lateral edge regions;

wherein the sealing arrangement which can be pressed transversely to the plane of the slidable component is also provided in an upper edge region; and wherein a sealing is provided in a lower edge region which can be pressed against a lower edge region in the vertical direction.

20. The façade system according to claim 13, wherein the slidable component is a horizontally slidable component, wherein the first side is a horizontally extending lower side of the slidable component; and wherein the second side of the slidable component is a horizontally extending upper side of the slidable component; and wherein the first guide groove and the second guide groove extend horizontally.

21. The façade system according to claim 13, wherein at least one of the eccentric bearing pins has a radially protruding projection on each side thereof;

wherein a stop element is formed in the guide groove on one side of the groove, with which stop element the radially projecting projection can be brought into engagement by rotating the eccentric bearing pin; and wherein the eccentric bearing pin is configured to be supported on the stop element to effect a secondary pressing parallel to the guide direction.

22. A method for moving a slidable facade component, comprising the steps of:

guiding a slidable component by engaging guide pins formed as eccentric bearing pins in a guide groove arrangement;

wherein the slidable component is configured for opening and closing a facade opening that is formed by a fixed opening edge;

wherein at least two guide pins are provided for a first side of the slidable component and at least two guide pins are provided for a second side of the slidable component opposite to the first side;

wherein the guide groove arrangement comprises a first guide groove in a first edge region of the opening edge and a second guide groove in a second edge region of the opening edge opposite the first edge region; and wherein the eccentric bearing pins are each rotatably mounted to the slidable component with an eccentrically disposed axis of rotation and are engaging with one of the guide grooves, wherein each eccentric bearing pin is a round disc with the axis of rotation arranged eccentrically relative to the round disc, wherein each eccentric bearing pin is configured to be arranged between two sidewalls of a corresponding guide groove of the guide groove arrangement;

actuating an actuator coupled to drive rods;

wherein actuation of the actuator causes longitudinal movement of the drive rods; wherein the eccentric bearing pins are coupled to the drive rods via coupling elements and the longitudinal movement of the drive rods causes rotation of the eccentric bearing pins, wherein each of the coupling elements has a slot configured for engagement with a corresponding pin attached to corresponding one of the drive rods, wherein each of the slots is defined by first and second operational edge sections parallel to one another and is configured to receive the corresponding pin between the first and second operational edge sections;

rotating the eccentric bearing pins within the guide groove by the actuation of the actuation device such that the eccentric bearing pins urge against a corresponding surface, thereby pushing the slidable façade component away from the corresponding surface; and thereby pressing the slidable component against a fixed frame portion transverse to the guide direction and moving the slidable component transverse to the guide direction.

* * * * *